United States Patent
Moulsley et al.

(10) Patent No.: US 8,493,925 B2
(45) Date of Patent: Jul. 23, 2013

(54) METHOD FOR COMMUNICATING IN A NETWORK, A SECONDARY STATION AND A SYSTEM THEREFOR

(75) Inventors: Timothy James Moulsley, Caterham (GB); Matthew Peter John Baker, Canterbury (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 179 days.

(21) Appl. No.: 13/058,631

(22) PCT Filed: Aug. 7, 2009

(86) PCT No.: PCT/IB2009/053475
§ 371 (c)(1),
(2), (4) Date: Feb. 11, 2011

(87) PCT Pub. No.: WO2010/018510
PCT Pub. Date: Feb. 18, 2010

(65) Prior Publication Data
US 2011/0143765 A1 Jun. 16, 2011

(30) Foreign Application Priority Data
Aug. 14, 2008 (EP) .................................. 08305480

(51) Int. Cl.
*H04W 4/00* (2009.01)
(52) U.S. Cl.
USPC ........................................................ 370/329

(58) Field of Classification Search
None
See application file for complete search history.

(56) References Cited

U.S. PATENT DOCUMENTS

2007/0155395 A1* 7/2007 Gopalakrishnan et al. ... 455/453
2009/0257385 A1* 10/2009 Meylan et al. ................ 370/329

FOREIGN PATENT DOCUMENTS

CN         101064905 A      10/2007

OTHER PUBLICATIONS

"Effect of False Positive Semi-Persistent Grants"; QUALCOMM Europe, 3GPP TSG-RAN WG2 #61BIS, vol. R2-081827, Mar. 31-Apr. 4, 2008, Retrieved From the Internet: http://www.3gpp.org/ftp/tsg_ran/WG2_RL2//TSGR2_61bis/Docs/., on Mar. 31, 2008, 2 Page Document.

* cited by examiner

*Primary Examiner* — Clemence Han

(57) ABSTRACT

The present invention relates to a method for communicating in a network, comprising a) a secondary station preparing the transmission to a primary station of a message comprising at least a data field for containing data in an allocated resource, said resource comprising a plurality of resource blocks, and b) if the size of the allocated resource is bigger than required for the size of the message, the secondary station dividing the allocated resource in a first portion and a second portion, each portion comprising at least one resource block, c) the secondary station transmitting the message to the primary station in the first portion of the resource, d) the secondary station preventing from transmitting in the second portion of the resource.

13 Claims, 2 Drawing Sheets

METHOD FOR COMMUNICATING IN A NETWORK, A SECONDARY STATION AND A SYSTEM THEREFOR

FIELD OF THE INVENTION

The present invention relates to a method for communicating in a network comprising a primary station and at least one secondary station, and to such a secondary station. More specifically, this invention relates to a method for communicating in a mobile telecommunication network, like a GSM (Global System for Mobile communications) or a UMTS (Universal Mobile Telecommunications System) network.

This invention is, for example, relevant for UMTS and UMTS Long Term Evolution, but as well to hubs which route calls from multiple terminals to base stations.

BACKGROUND OF THE INVENTION

In a mobile telecommunication network like a UMTS system, a primary station, for instance a Node B (or Base Station or eNB) communicates with at least one secondary station, for instance a User Equipment (or Mobile Station), by means of a plurality of channels. In order to transmit data to the primary station, a secondary station needs to request a resource to the primary station, which is then allocated. This request of allocation can be made in several ways depending on the considered channel.

In an example, in order to request a resource, it is required to indicate the amount of data to be transmitted, i.e. the data in the buffer of the secondary station. To this end, the secondary station transmits to the primary station a buffer status report indicative of the amount of data in the secondary station buffer. Thus, the primary station allocates a resource corresponding to both the capability of the network and the amount of data to be transmitted. This permits the allocation of resource to be adjusted.

However, if a message relating to an uplink resource grant is received in error, i.e. the secondary station had no use of this resource because no data is to be transmitted, or when no uplink resource grant was transmitted, this can lead to several problems. For false uplink grant, the secondary station transmits a data packet using the whole granted resource. Even if the secondary station has no data it will transmit a buffer status report using the whole of the resource indicated in the grant, for instance by completing the resource with padding bits.

Moreover, some systems use semi persistent scheduling, according to which some parameters may be configured by higher layers, and resources are granted on a periodic basis in order to match the needs of specific applications (for example uplink transmission resources every 20 ms to support VoIP). In case of false semi persistent scheduling (SPS) activation, the secondary station will periodically transmit data packets using the whole granted resource. If the secondary station has no data to transmit, it transmits a BSR, but releases the resource after a configurable number of transmissions if there is still no data to send. In both cases significant uplink interference is generated, even if the secondary station has no data to send.

SUMMARY OF THE INVENTION

It is an object of the invention to propose a method enabling this problem to be alleviated.

It is still another object of the invention to propose a method improving the management of resources.

It is still another object of the invention to propose a method permitting to reduce the interference on the uplink channel.

To this end, a method of communicating in a network is proposed, said method comprising
  a) a secondary station preparing the transmission to a primary station of a message comprising at least a data field for containing data in an allocated resource, said resource comprising a plurality of resource blocks, and
  b) if the size of the allocated resource is bigger than required for the size of the message, the secondary station dividing the allocated resource in a first portion and a second portion, each portion comprising at least one resource block,
  c) the secondary station transmitting the message to the primary station in the first portion of the resource,
  d) the secondary station preventing transmission in the second portion of the resource.

In accordance with a second aspect of the invention, a secondary station is proposed, said secondary station comprising a controller for preparing the transmission to a primary station of a message comprising at least a data field for containing data in an allocated resource, said resource comprising a plurality of resource blocks, wherein the controller being arranged to dividing the allocated resource in a first portion and a second portion, each portion comprising at least one resource block, if the size of the allocated resource is bigger than required for the size of the message, and means for transmitting the message to the primary station in the first portion of the resource, wherein the controller is arranged to prevent the transmitted from transmitting in the second portion of the resource.

In accordance with a third aspect of the invention, a system of communication is proposed, said system comprising a primary station and at least one secondary station a controller for preparing the transmission to the primary station of a message comprising at least a data field for containing data in an allocated resource, said resource comprising a plurality of resource blocks, wherein the controller being arranged to dividing the allocated resource in a first portion and a second portion, each portion comprising at least one resource block, if the size of the allocated resource is bigger than required for the size of the message, and means for transmitting the message to the primary station in the first portion of the resource, wherein the controller is arranged to prevent the transmitted from transmitting in the second portion of the resource.

In accordance with a fourth aspect of the invention, a primary station is proposed, said primary station comprising means for communicating with a secondary station, said means comprising a receiver for receiving a message from the secondary station, a decoder for decoding the message with a message size corresponding to the allocated resource and a controller for selecting one message size from a set of message sizes if decoding fails, wherein the decoder is arranged to decode the message with this selected message size.

As a consequence, interference, especially in case of resources granted in error or falsely received, is reduced, since the secondary station does not transmit during a portion of the allocated resource. This is even more efficient for semi persistent schedule (SPS) activation, where the allocated resource can be allocated for several subframes or frames.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
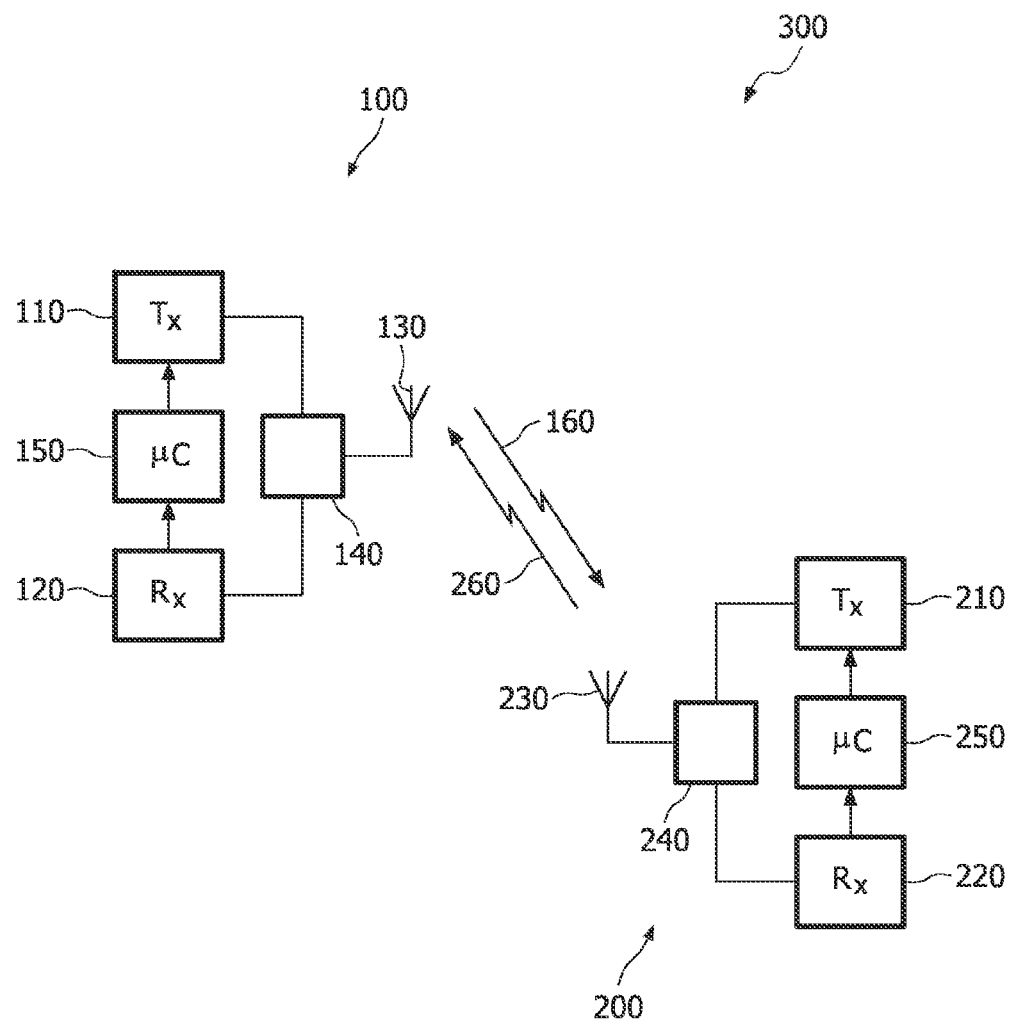
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

As explained before, in LTE, if a message relating to an uplink grant is received in error, or the UE decodes one when none was transmitted, then the following problems can occur.

For false uplink grant, the secondary station transmits a data packet using the whole granted resource. Even if the UE has no data it will transmit a BSR using the whole of the resource indicated in the grant.

For false SPS activation, the UE will periodically transmit data packets using the whole granted resource. If the UE has no data it will transmit a BSR, but release the resource after a configurable number of transmissions if there is still no data to send.

The main consequence is that, in both cases, significant uplink interference is generated, even if the UE has no data to send.

One possible solution would be for the UE to transmit nothing in the case that it receives a grant but has no data. However, this would not allow the eNodeB to receive any other small messages, such as a BSR (Buffer Status Report) that would be transmitted if there was data to be sent at the same time.

The embodiments of this invention are based on the recognition that the UE does not need to transmit using the whole granted resource in the case that it has no data, but there is some other small message to send. It must be noted that this may have a drawback, which is the requirement of more processing on the primary station side.

In the case that a secondary station should transmit some small message, such as Buffer Status Report, even when it has no data, then it is proposed that the secondary station transmits with a limited resource (and a reduced transport block size). To ensure that the primary station is aware of the resulting message size and resources used, these should ideally be derived from the granted resource. For instance, if the granted resource is n resource blocks, the size of the utilized resource could be 0.25n blocks.

In the case that the secondary station really is granted a resource, but has no data, then it can still send a Buffer Status Report or other message. In the case of a false detection of an uplink grant, the resulting uplink interference will typically be much lower than if the UE used the full granted resource. This permits then to increase the Quality of Service of the whole system The main disadvantage of this invention is that the primary station may have additional processing. For example, if reception of an uplink packet fails, the primary station may need to also attempt decoding under the assumption that a BSR is sent with no data in the smaller resource. This would require additional soft buffers to be maintained. Fortunately the extra processing load will be small, since the transport block size for BSR will not be large. As a consequence, the further processing load can be coped with.

In an embodiment based on LTE, if a secondary station receives a grant for uplink transmission, but has not data to send, the specification requires it to send a buffer status report. The BSR is sent in a resource derived from the grant message. As an example this could be defined to be the single lowest frequency resource block within the set of resource blocks in the granted resource. The transport block size is fixed to be the smallest size which can contain the BSR (and any associated overheads).

The application of the invention is not restricted to LTE. The resources could be frequency domain resource blocks, time slots or codes.

The invention could also be applied to other messages, such as a report on radio channel status. The main requirement is that the message size is known. Then the eNodeB will be able to perform an additional decoding assuming the message size (and resource allocation). Support of a small set of allowed message sizes would be possible.

The invention could also be applied in the case that the resource is much too large for the data packet, in which case a smaller resource could be used instead (e.g. half the granted resource). In general, this approach would lead to a small number of additional resource sizes (and transport block sizes) which would be allowed in response to each UL grant. The eNodeB might thus be required to perform more than one decoding attempt for each packet, under different assumptions about its size.

In a variant of the invention, this invention could be used in combination with one of the following embodiments.

From time to time, the secondary station 200 transmits on the uplink channel 260 an indication of the status of its buffer containing data to be transmitted. This Buffer Status Report can be of different types. A short Buffer Status Report (BSR) comprises the identity of a single group of logical channels, together with a 6-bit indicator of the amount of data corresponding to that group of logical channels currently residing in the secondary station's buffer awaiting transmission. A long BSR comprises 4 concatenated short BSRs, each corresponding to a different group of logical channels.

Many communication systems operate using a centralised scheduler which is responsible for allocating transmission resources to different nodes. A typical example is the uplink of the UMTS LTE, where the uplink transmissions from different UEs are scheduled in time and frequency by the eNB; the eNB transmits a "scheduling grant" message to a UE, indicating a particular time-frequency resource for the UE's transmission typically around 3 ms after the transmission of the grant message. The grant message also typically specifies the data rate and/or power to be used for the UE's transmission.

In order for the eNB to issue appropriate grants, it needs to have sufficient information about the amount, type of data and the urgency of it awaiting transmission in the buffer of each UE. This information can be used to inform the scheduler in the eNB of either the satisfaction level of individual UEs or UEs whose service might be close to being dropped.

In LTE, a number of different types of buffer status report (BSR) messages are therefore defined, which may be transmitted from a UE to the eNB when certain triggers occur. The state of the art in this respect is defined by the current version of 3GPP TS36.321 (as of June 2008), §5.4.5 incorporated for reference.

A short BSR comprises the identity of a single group of logical channels, together with a 6-bit indicator of the amount of data corresponding to that group of logical channels currently residing in the UE's buffer awaiting transmission. A long BSR comprises 4 concatenated short BSRs, each corresponding to a different group of logical channels.

This is currently defined in 36.321 (as of June 2008) §6.1.3.1 incorporated by reference.

As detailed in this paragraph, there are two main types of Buffer Status Reports (BSR) with different characteristics:
  Regular BSR which is triggered only if UL data arrives in the UE transmission buffer and the data belongs to a logical channel with higher priority than those for which data already existed in the UE transmission buffer.
  Periodic BSR, which is triggered when the PERIODIC BSR TIMER expires.

If the UE has no UL resources allocated for new transmission for this TTI and if a Regular BSR has been triggered since the last transmission of a BSR a Scheduling Request (SR) shall be triggered.

The BSR mechanism has been designed so that only regular BSRs can trigger the sending of an SR if there is no UL resources available for the sending of the a regular BSR. When a periodic BSR is triggered and there is no UL resource allocated then the UE cannot send SR, as it is assumed that the network knows that the UE has data available and is deliberately not allocating any UL resources for the UE to use.

If the periodic BSR were allowed to send SR in the case of no UL resource available for the sending of the BSR then the system may become overloaded with UEs sending SR. Particularly if the UE has no PUCCH resources available, when an SR would require the sending of a RACH access.

Also, it is stated in 36.321 that an SR is considered pending and is repeated until UL-SCH resources are granted.

A problem with the BSR procedure defined above is that there is a possibility that the information that the network knows about the state of the buffers in the UE can be different from the actual state of the UE buffers. This can occur when BSRs are received in the eNB out of order.

Figure 2:
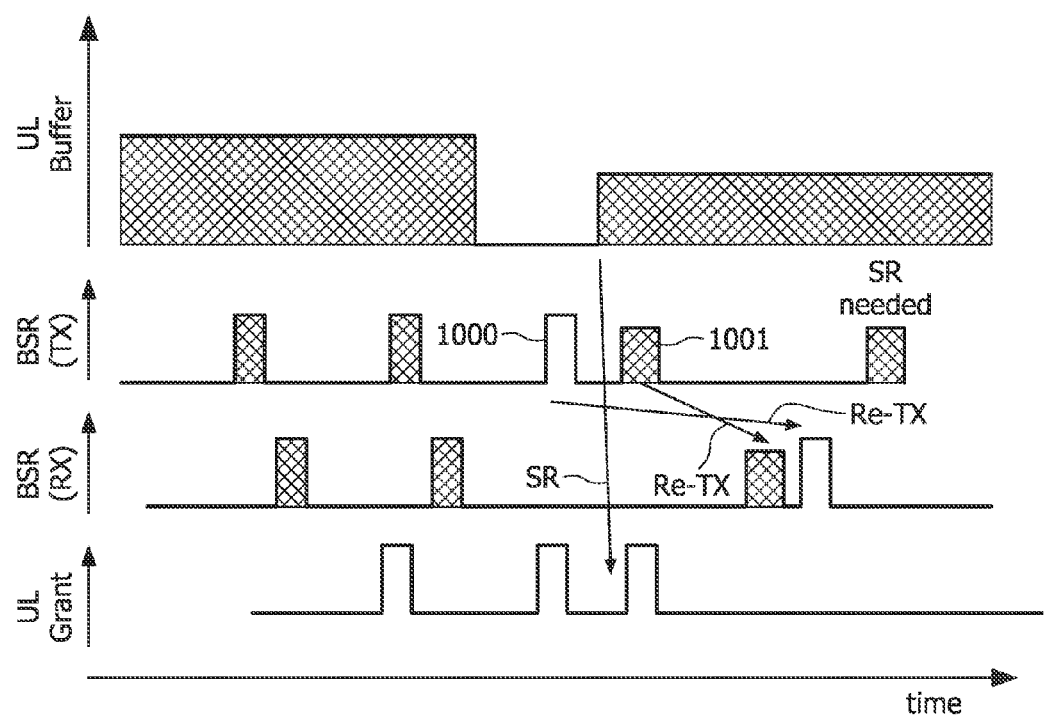
FIG. 2 is a time chart illustrating the exchange of messages in accordance with a conventional technique.

If a network receives BSRs from a UE at different times there is no way for the eNB to determine which was the last BSR sent by the UE as an earlier BSR may just be being received late, for example due to HARQ retransmissions. This can lead to the problem that a BSR with zero may be received by the UE and then the network removes UL resource from the UE, even though the UE now has data to be sent in its buffer. The UE cannot send SR as the trigger for a regular BSR (new data with higher priority) is not met even if a periodic BSR is configured An example of this is shown on FIG. 2. On this time chart, it can be seen that the buffer status report 1000, which is sent before the buffer status report 1001, is received only after, because of the number of retransmissions. This report 1000 may be a periodic report, which can indicate that no data is in the buffer status report. If the primary station receives the reports in the indicated order, it will wrongly believe that the current status is that no data is in the buffer of the secondary station. Because of that, it will remove the UL resource from UE, that should have been granted.

If the report 1000 is a normal report indicating that there is data to be transmitted, and report 1001 a periodic report indicating that there is no more data to be transmitted, the primary station may, because of this confusion allocate a resource although it was not required. This leads to a waste of resources. However, this situation is less likely to happen.

The main problem here is that an SR should not be generated from a periodic BSR, because if an SR were generated from a periodic BSR then the UE would be constantly asking for UL resources when there may be none available.

Moreover, in the case described above the network view of the buffer status is out of synchronisation with the actual UE UL data buffer status. One aspect of the present invention provides a method for transmission of BSRs with modified channel coding in order to make their transmission more robust and reduce the risk of this problem occurring, as will be explained hereafter.

In LTE, when the secondary station has an uplink grant which is too large for the amount of data (which is the case for instance is no data is in the buffer), it will transmit anyway and add padding, including a padding BSR if possible. Padding is applied in order to reach the granted transport block size. This will occur even if there is no data to be transmitted. This situation can lead to wasted uplink resources from sending the padding bits.

Reliable reception of the BSR is important, in order to allow efficient scheduling. Therefore methods for improving BSR robustness are of interest.

In principle it would be possible to make use of the padding bits in the decoding process (provided their values are known). However, this would require changes to receiver decoding algorithms, and would not be the most efficient way of using these bits.

These embodiments which could be combined with the preceding embodiments of the invention are based on the recognition that when a secondary station is granted more resource than is required for uplink data transmission plus other signalling such as BSR, it may use the additional resource to transmit additional redundancy, rather than padding bits. This can increase the probability of correct decoding of the BSR message.

The main disadvantage of e embodiments where the UE may transmit messages with more than one format for a given granted resource is that the primary station or eNodeB may need to carry out additional processing. For example, if reception of an uplink packet fails, the eNodeB may need to also attempt decoding under the assumption that only a padding BSR (or other message of known size) has been sent instead. This would require additional soft buffers to be maintained. Fortunately the extra processing load will typically be small, since the transport block size for BSR will not be large.

In one variant based on LTE, when a secondary station receives an UL grant (indicating a resource and a transport block size) but has no data to send, it transmits a padding BSR. According to the invention the transport block size is reduced to a value which is just sufficient to send the BSR message. Then channel coding is applied in the usual way, and this will add redundancy up to the transport block size. The eNodeB can attempt to decode the resulting message first under the assumption of a normal transmission, then if that fails, under the assumption that BSR was sent with a smaller transport block (but with one of a limited set of sizes).

In another variant based on LTE, when a secondary station receives an uplink grant (indicating a resource and a transport block size) but has less data to send than indicated in the grant, then according to the invention it assumes a reduced transport block size (which may be chosen from a limited set), and transmits a padding BSR and data. The channel coding is applied in the usual way for that selected transport block size. As a consequence, the channel coding may typically be of a lower rate than the coding corresponding to the block of a normal size, and therefore the transmission will be more robust to errors. The eNodeB can attempt to decode the resulting message first under the assumption of a normal transmission, then if that fails, under the assumption that BSR was sent with a smaller transport block size (but with one of a limited set of sizes) and its corresponding coding. In a variant of this embodiment, only one coding is associated to each size of transport block.

In still another variant of this embodiment based on LTE, when a UE receives an UL grant (indicating a resource and a transport block size) but has less data to send than indicated in the grant, the transport block size is not changed, but the message is repeated inside the transport block to increase its size to be equal to the granted transport block size. Channel coding is applied in the usual way. This means that the padding bits are effectively replaced by data repetition. This has the disadvantage of requiring a change to the receiver decoding architecture, in order to exploit the data repetition efficiently.

This invention and its various embodiments may be implemented in mobile communication systems where communication devices utilize centralized scheduling, such as UMTS and LTE.

Moreover, this invention could as well be implemented for hubs which route connections from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for communicating in a network, comprising:
   a) a controller of a secondary station preparing a transmission to a primary station of a message comprising at least a data field for containing data in an allocated resource, said resource comprising a plurality of resource blocks, and
   b) when the size of the allocated resource is bigger than required for the size of the message, the controller of the secondary station dividing the allocated resource into a first portion and a second portion, each portion comprising at least one resource block,
   c) a transmitter of the secondary station transmitting the message in the first portion of the resource, to the primary station,
   d) the secondary station preventing transmission in the second portion of the resource.

2. The method of claim 1, wherein the message comprises a report to be transmitted along with the data field.

3. The method of claim 2, wherein the report is indicative of the amount of data in a buffer of the secondary station.

4. The method of claim 2, wherein the dividing act is carried out if no data is to be transmitted in the data field.

5. The method of claim 1, wherein the size of the first portion is derived from the size of the allocated resource.

6. The method of claim 5, wherein the size of the first portion is a ratio from the allocated resource, said ratio being selected from a set of predetermined ratios.

7. The method of claim 1, wherein the at least one resource block of the first portion is deduced from the allocated resource in a predetermined manner.

8. The method of claim 7, wherein the at least one resource of the first portion is the lowest frequency resource block of the allocated resource.

9. The method of claim 1, wherein prior to transmission the secondary station uses a channel coder for channel coding the message, and the channel coding applied to the message is determined according to the size of the message and the size of the first portion of the resource.

10. The method of claim 1, further comprising:
    e) a receiver of the primary station receiving the message,
    f) a decoder of the primary station decoding the message with a message size corresponding to the allocated resource and
    g) when decoding fails, a controller of the primary station selecting one message size from a set of message sizes and decoding the message with this selected message size.

11. A secondary station comprising:
a controller for preparing the transmission to a primary station of a message comprising at least a data field for containing data in an allocated resource, said resource comprising a plurality of resource blocks, and when the size of the allocated resource is bigger than required for the size of the message, the controller being configured to divide the allocated resource into a first portion and a second portion, each portion comprising at least one resource block, and
a transmitter for transmitting the message to the primary station in the first portion of the resource, and wherein the controller is configured to prevent transmission in the second portion of the resource.

12. A system comprising:
a primary station, and
a secondary station having:
a controller for preparing the transmission to the primary station of a message comprising at least a data field for containing data in an allocated resource, said resource comprising a plurality of resource blocks, and when the size of the allocated resource is bigger than required for the size of the message the controller being configured to divide the allocated resource into a first portion and a second portion, each portion comprising at least one resource block, and
a transmitter for transmitting the message in the first portion of the resource, to the primary station, and wherein the controller is arranged to prevent the transmission in the second portion of the resource.

13. A system comprising:
a primary station:
a secondary station comprising:

a secondary station controller for preparing the transmission to the primary station of a message comprising at least a data field for containing data in an allocated resource, said resource comprising a plurality of resource blocks, and when the size of the allocated resource is bigger than required for the size of the message the secondary station controller being configured to dividing the allocated resource into a first portion and a second portion, each portion comprising at least one resource block, and a transmitter for transmitting the message in the first portion of the resource, to a primary station, and wherein the secondary station controller is arranged to prevent the transmission in the second portion of the resource, the primary station comprising:

a receiver for receiving the message from the secondary station, a decoder for channel decoding the message with a message size corresponding to the allocated resource of the secondary station, and a primary station controller for selecting one message size from a set of message sizes when decoding fails, and wherein the decoder is configured to decode the message with this selected message size.

* * * * *